May 31, 1927.
S. H. TINSMAN
1,630,772
RIDING CULTIVATOR
Filed Feb. 24, 1925
5 Sheets-Sheet 4
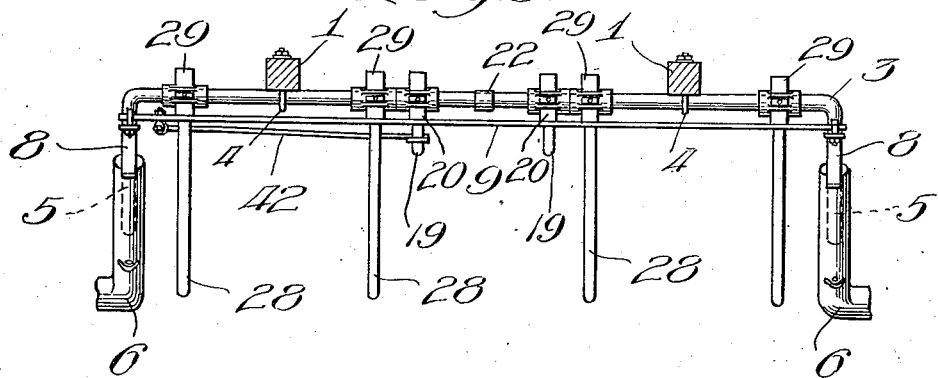
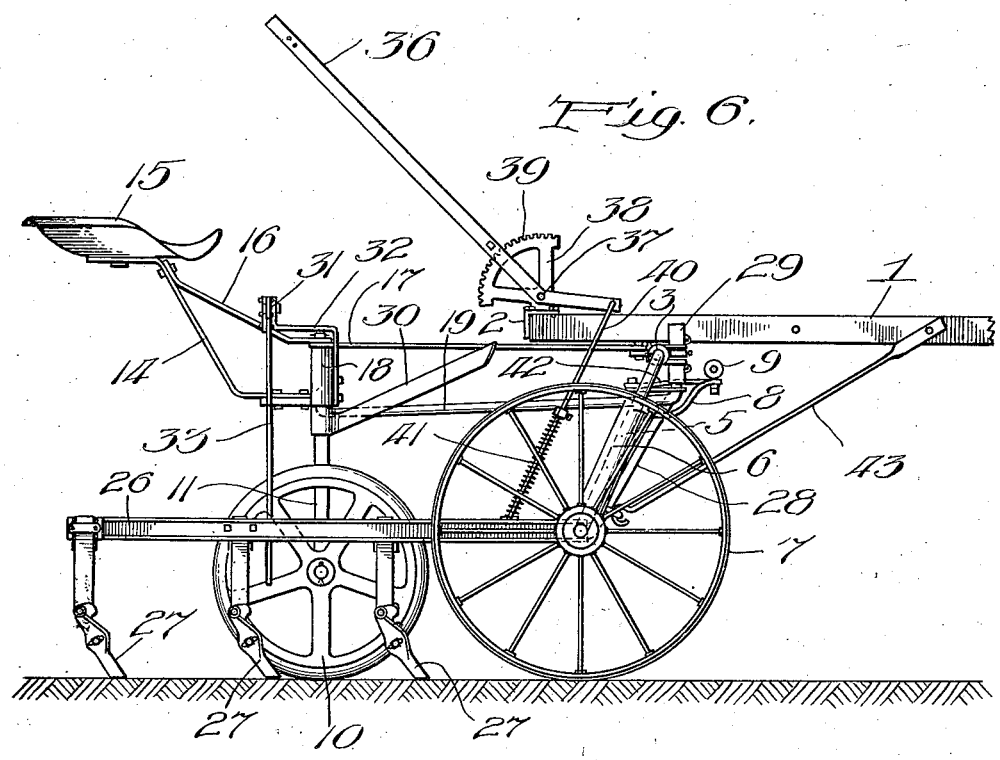
Inventor:
Samuel H. Tinsman,
by Arthur F. Durand
Atty.

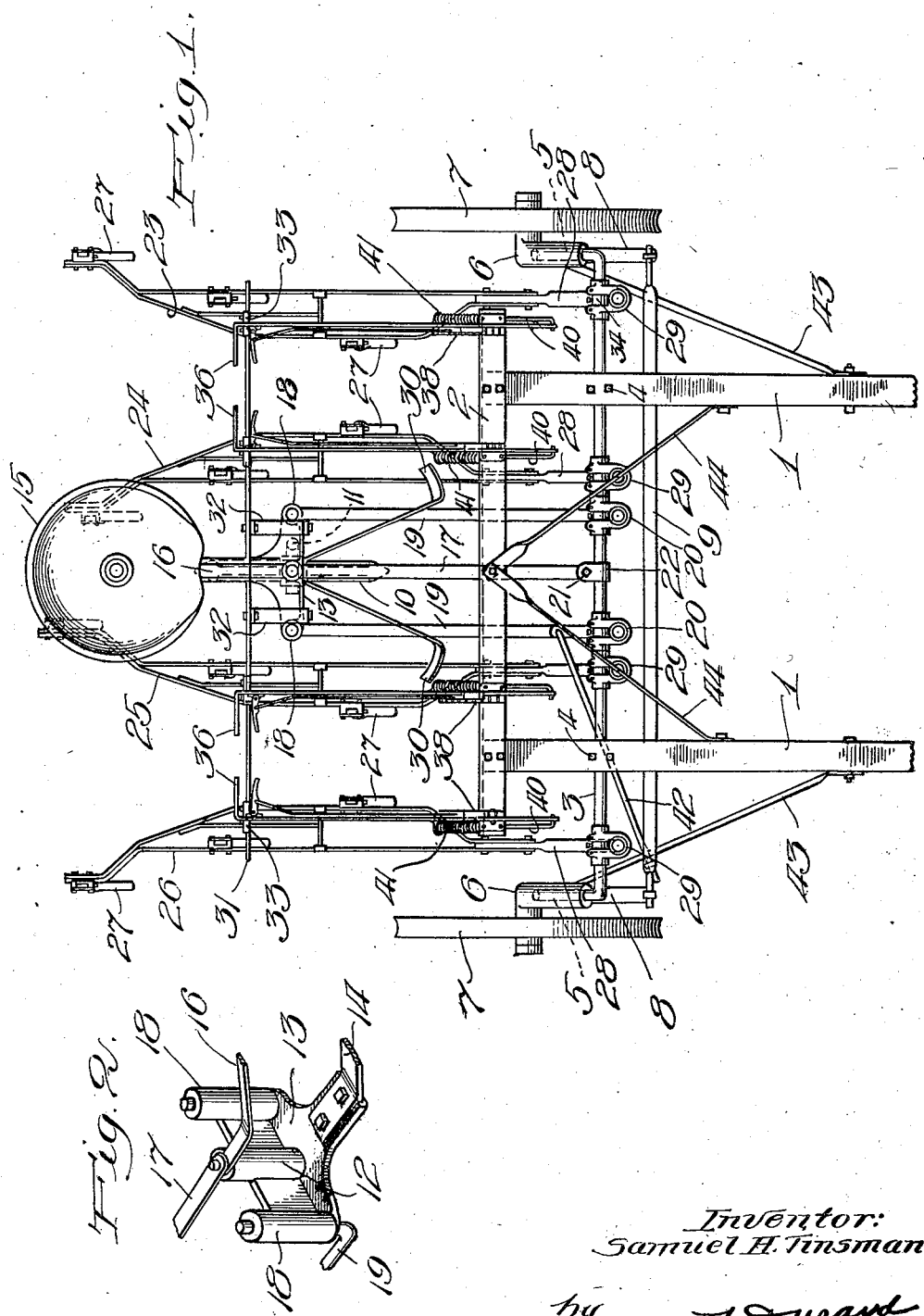

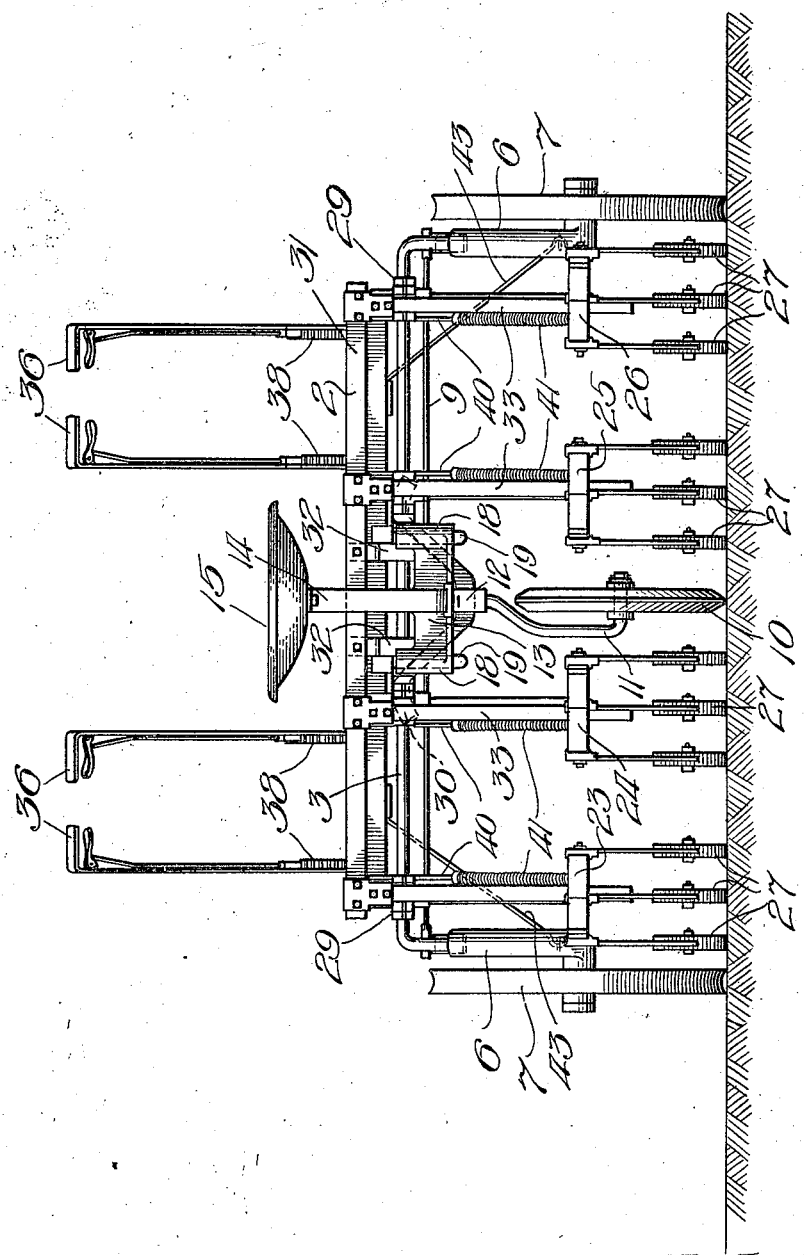

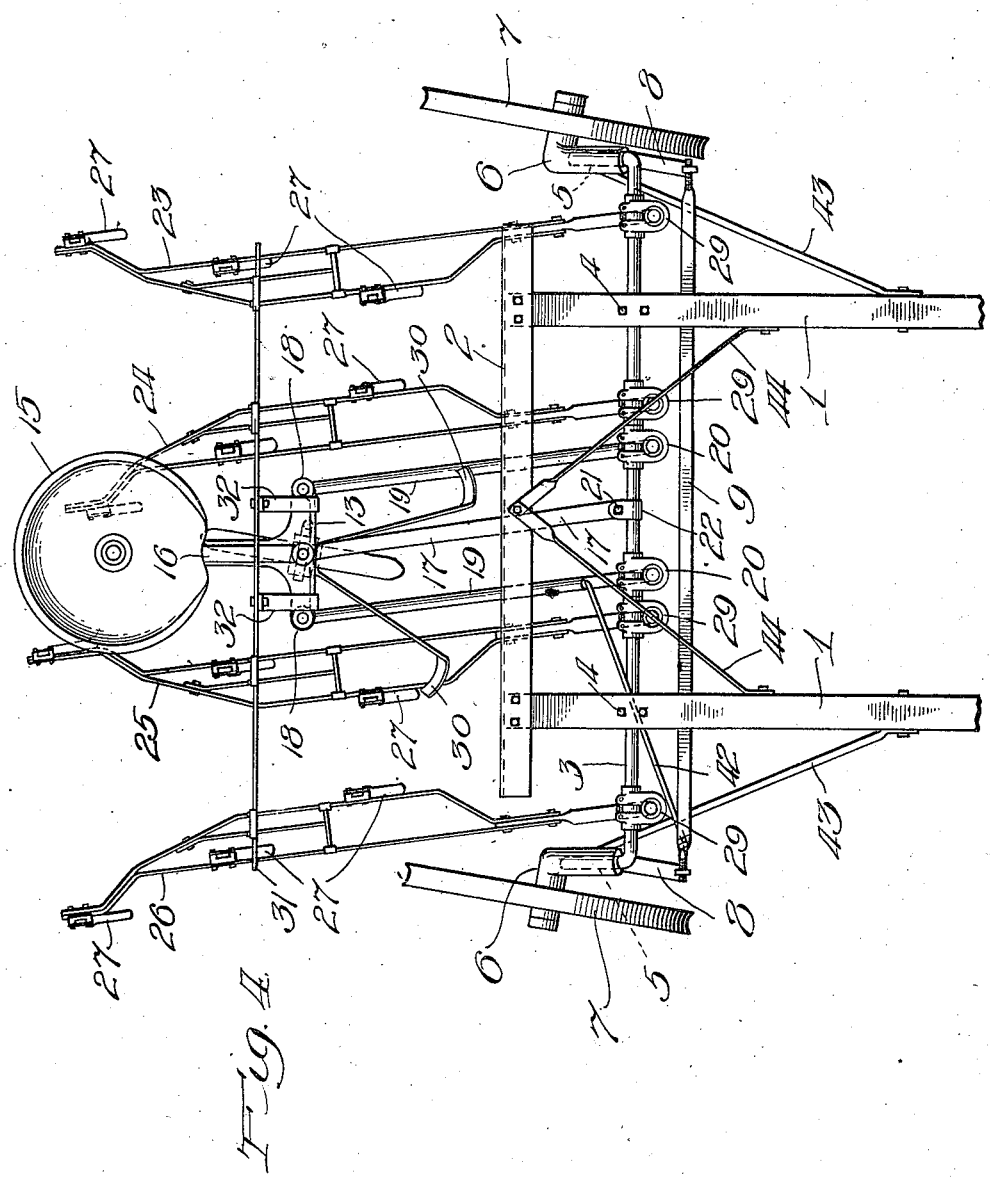

May 31, 1927.    S. H. TINSMAN    1,630,772
RIDING CULTIVATOR
Filed Feb. 24, 1925    5 Sheets-Sheet 5
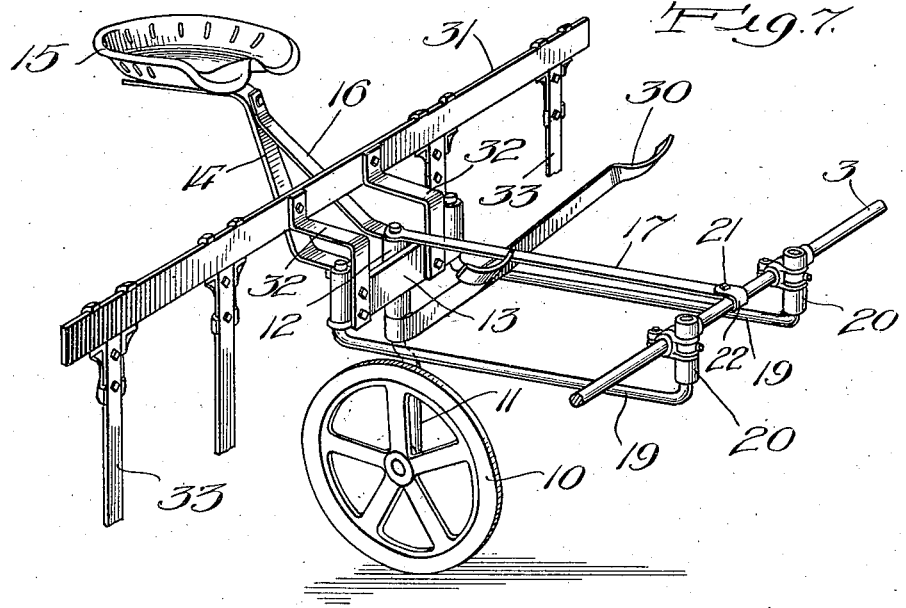
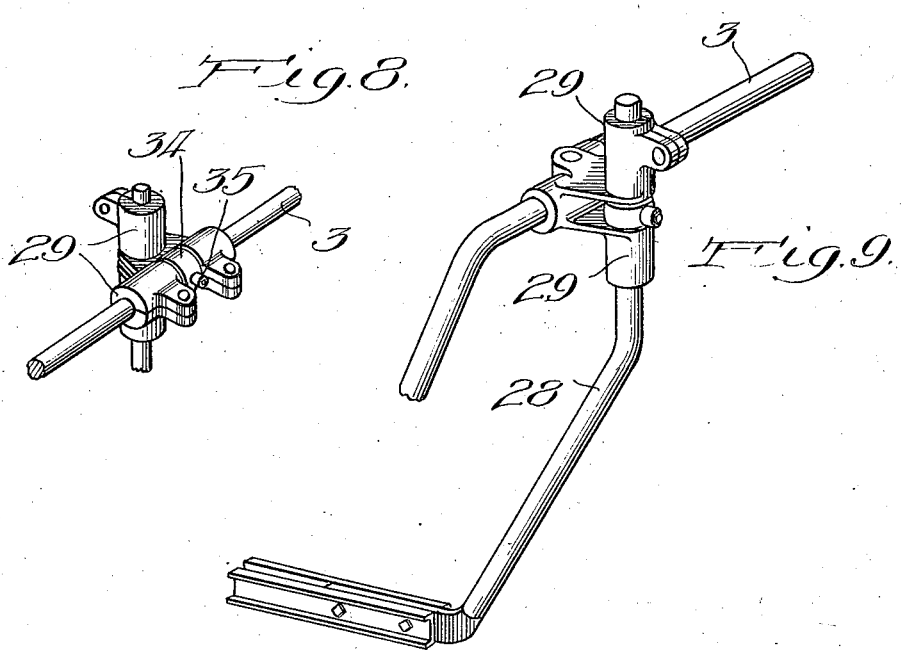
Inventor:
Samuel H. Tinsman
by Arthur H. Durand
Atty.

Patented May 31, 1927.

1,630,772

UNITED STATES PATENT OFFICE.

SAMUEL H. TINSMAN, OF MORRIS, ILLINOIS.

RIDING CULTIVATOR.

Application filed February 24, 1925. Serial No. 11,080.

This invention relates to riding cultivators in general, but more particularly to those which are adapted to cultivate two rows of corn or other things at the same time, sometimes called double-row cultivators, and especially to those which have provisions of some kind for enabling the driver to steer or swerve the machine to the right or the left, while the cultivator is in action, thereby to follow the rows of corn or other things, or for the purpose of dodging or driving around obstructions.

Generally stated, the object of the invention is to provide novel and improved means for steering the cultivator to the right or to the left, while the machine is in use, and thereby to facilitate and render more satisfactory the operation of the cultivator.

More specifically considered, the object of the invention is to provide a steering means that contemplates broadly the provision of a rear steering wheel or other similar means, whereby the cultivator is adapted to be steered from the rear, or caused to swerve to the right or the left, as may be desired in cultivating rows of corn or other things.

Another object is to provide an improved construction and arrangement tending to reduce the cost of manufacture of a cultivator of this character.

It is also an object to provide certain details and features of construction, and novel combinations tending to increase the general efficiency and the desirability of a riding and steering cultivator of this particular character.

To the foregoing and other useful ends, the invention consists in the matters hereinafter set forth and claimed, and shown in the accompanying drawings, in which,—

Fig. 1 is a plan of a riding and steering cultivator embodying the principles of the invention.

Fig. 2 is a detail, perspective view of a portion of the said cultivator.

Fig. 3 is a rear view of the cultivator shown in Fig. 1.

Fig. 4 is a view similar to Fig. 1, but showing the steering instrumentalities operated to steer the machine to the right.

Fig. 5 is a front elevation of the axle arch or transverse, bail-shaped, axle like member upon the ends of which the front wheels are mounted.

Fig. 6 is a side elevation of said cultivator.

Fig. 7 is a fragmentary, perspective view showing the rear steering mechanism for the cultivator.

Fig. 8 is a fragmentary, perspective view of a portion of the construction.

Fig. 9 is a fragmentary, perspective view of a portion of the construction.

As thus illustrated, the invention comprises a rigid frame composed of the poles or tongues 1 connected at their rear ends by the cross bar 2 in any suitable or desired manner. The axle arch 3 extends transversely and is secured to the under side of the poles or tongues 1 by clips or fastening devices 4 of any suitable character. The downturned end portions 5 of the axle arch have L-shaped members 6 swiveled thereon and forming axles for the front wheels 7 of the machine. Said members 6 have forwardly-projecting rigid arms 8 which are connected together by the cross bar 9 suitably connected to the ends of said arms, whereby when one wheel 7 is skewed, the other wheel is necessarily skewed at the same angle.

The rear steering wheel 10 is mounted on a vertically disposed member 11 which turns in a vertically disposed bearing 12 which is rigid with the casting 13 to which the seat bar 14 is bolted, said bar having its upper portion provided with a seat 15 of any suitable character. Said seat bar is connected by an upper brace 16 with the top of the bearing 12, as shown, and a longitudinal bar 17 connects the upper end of said bearing 12 with the middle portion of the axle arch 3 previously mentioned. The casting 13 has two vertically disposed bearings 18 spaced a distance from the sides of the bearing 12, and these bearings 18 are occupied by the upturned rear end portions of the rods 19, which latter in turn have their front upturned ends held in swivel bearings 20, whereby the trailing steering wheel 10 and the seat 15 supported thereby can be swung to the right or the left about the pivots provided by the bearings 20, and about the pivot 21 provided between the bar 17 and the clamp 22 on the axle arch, the elements 17 and 19 forming a sort of parallel motion connection whereby the casting 13 will always remain parallel with the transverse middle portion of the axle arch 3, even when the wheel 10 is turned to swerve the driver's seat to one side or the other.

The cultivator gangs 23, 24, 25 and 26 are of any suitable character, comprising cultivator teeth or blades 27 suitably mounted on the gang frames, which have forward upturned end portions 28 inserted upwardly through the bearings 29 that are mounted to turn freely on the middle portion of the axle arch 3, whereby the gangs can swing sidewise, and may also be raised and lowered. The swerving of the gangs to one side, when the wheel 10 is turned in one direction or another, by the rigid foot pedals 30, which are rigid with the member 11 upon which the wheel is mounted, is accomplished through the medium of a cross bar 31, which is rigidly connected by straps 32 with the casting 13, said bar 31 having rigid and downwardly projecting portions 33 which extend downwardly through the gang frames in a manner that permits the frames to swing up and down, but with such engagement of said frames that the gangs are held a fixed distance apart and will be swerved to one side or the other when the seat 15 and the steering wheel 10 are swerved to one side or the other by the turning of said wheel in either direction. The gangs can slide up and down on the portions 33, but any lateral shifting of the bar 31, brought about by turning the wheel 10 in either direction, will swerve the gangs over to one side. See Fig. 4 of the drawings. The bearings 29 are held against lateral displacement on the arch 3 by collars 34 which are held by set screws 35 in fixed position on the arch 3, whereby the bearings 29 may turn or oscillate about a horizontal, transverse axis formed by the middle portion of the axle arch 3, but are held against lateral displacement thereon.

For the purpose of raising and lowering the gangs, a hand lever 36 is provided for each gang and pivoted at 37 on a bracket 38 having a segment 39 to be engaged by the locking means ordinarily and commonly provided on hand levers of this kind, said bracket 33 being suitably secured to the cross bar or beam 2 previously mentioned. The lower or shorter end portion of the hand lever is connected by a rod 40 with the cultivator gang below, by means of loose connections between each rod 40 and its alloted gang, and a spring 41 is applied to each rod in such a manner that the spring tends to hold the gang down, but may yield while the hand levers 36 are in locked position, in order to permit the gangs to rise over hard ground or obstructions. It will be understood, however, that the invention is not limited to any particular locking and raising means for the gangs, and that any suitable or desired means may be employed for this purpose.

In order that the wheels 7 may be automatically controlled by the steering mechanism in the rear, a link 42 is provided between one of the rods 19 and the bar 9 previously mentioned, as shown in Figs. 1 and 4, whereby the skewing of the wheel 10 by means of the foot pedals 30 in the manner previously described, and the consequent swerving of the seat-supporting structure to one side or the other, will automatically skew the wheels 7 in a direction to assist in steering the cultivator in the desired manner. It will be seen, therefore, that the invention not only contemplates broadly the provision of rear steering means for a riding cultivator, or other agricultural implement, but also contemplates the combination of such steering means with front steering wheels which are automatically controlled by the action of the rear steering mechanism, so that the front wheels and rear wheel co-operate to steer the cultivator to the right or to the left, and this entire steering arrangement is controlled by the action of the feet of the driver on the short levers 30 which are rigid with the vertically disposed member 11 which carries the steering wheel 10 in the manner shown and described. It will further be seen that the members 6 are connected by braces 43 to the poles or tongues 1, and that the latter are connected by braces 44 with the middle portion of the frame beam 2 previously described. In this way the angle of the axle arch relatively to the poles or tongues 1 is maintained by the braces 43, in a manner that will be readily understood, and the poles or tongues are maintained in their parallel relation and at right angles to the beam 2 by the braces 44, which form therewith a rigid draft frame for the cultivator or other agricultural implement.

From the foregoing it will be seen that a novel construction and arrangement is provided, whereby a riding cultivator is produced, having a front axle arch and a plurality of gangs, forming a double-row cultivator, and having rear steering means of any suitable character, but preferably in the form of a rear wheel which can be skewed to the right or the left by the driver, preferably by foot control, in combination with means whereby such wheel is operative to cause the cultivator gangs to swerve to the right or the left. The rear wheel, in some ways, acts like a rudder, for when it is skewed to the right it quickly shifts the gangs over to the right, and when skewed to the left serves to immediately shift the gangs to the left. In addition, however, such rear steering mechanism, by reason of its ability to swerve the gangs to the right or the left, is operative to control the front wheels of the cultivator, and to exercise such control over said front wheels that the latter contribute to the desired steering of the cultivator to the right or the left. In other words, when the rear wheel is skewed to the right, the effect is to automatically skew the front wheels to the right, so that the entire machine will immediately be guided to the right, and the same effect is produced when the rear wheel is skewed to the left, for in such case the entire machine will then be guided to the left. This is done in a manner which is easy and convenient for the driver, inasmuch as only a slight foot pressure on the short foot levers which control the rear wheel is necessary to turn this wheel to the right or the left, thus leaving the hands of the driver free to control the horses, and free to manipulate the hand levers by which the gangs are raised and lowered, whenever such is necessary or desirable.

Furthermore, it will be seen that the construction of the cultivator, including the front axle arch and its connections for the cultivator gangs, is of a simple and practical form and character, and is of such a nature that a cultivator may be manufactured at a comparatively low cost of production. Thus, and while the cultivator may be manufactured comparatively inexpensively, the construction is nevertheless strong and serviceable, and is characterized by the provision of steering means involving a rear steering wheel or trailing means whereby the cultivator may be steered to the right or the left at the will of the driver.

Of course, and by having the links 19 connected to the lower ends of the bearings 18, while the upper link 17 is connected to the upper end of the bearing 12, in the manner shown, the casting 13 is maintained in an upright position, and it will further be seen that by this arrangement the seat is not skewed to the right or the left during the steering operation, inasmuch as the front side of the casting 13 always remains parallel with the axle arch. The rear trailer in effect provided by the wheeled seat-supporting structure thus formed has a draft connection to the axle arch, so that this trailer may swing laterally relatively to the front wheeled structure formed by the axle arch and front wheels and the poles or tongues previously described. By skewing the wheel 10, the trailer, so-called, can be steered to the right or the left, and this steering action, through the medium of the bar 31 and the downwardly extending portions 33 thereof, will cause the cultivator gangs or other ground-engaging or ground-disrupting devices or means to swing laterally in the desired manner, thereby to follow the rows of corn or other things to be cultivated, or to dodge obstructions, or for any reason which may be desired, in connection with the use of a cultivator or other agricultural implement.

Thus the gangs or other ground-disrupting or ground-engaging means can be lifted from the ground, by means supported on the forward wheeled structure, without imposing any of the weight of said gangs or other means on the rear trailer or rear steering means. In this way, the ground wheel 10 of the rear trailer never supports anything more than the weight of the trailer and the weight of the driver, as the structure is amply sufficient to support the gangs in raised position, even though the trailer were omitted. The trailer is operative, however, in the manner explained, and by means of the bar 31 which is rigid with the seat support, and by means of the projecting portions 33, to automatically swerve the gangs to one side or the other, when the trailer is steered to the right or the left.

The wheel 10 and the foot pieces 30 constitute a steering means, it will be understood, in the sense that these elements are controllable by the driver to steer the trailer to the right or the left, and to thereby steer the gangs to the right or the left, irrespective of whether the front wheeled vehicle frame is steered to the right or the left. The wheel 10 and elements associated therewith form a trailer for the cultivator, and this trailer can be steered to the right or the left, as explained, by the driver occupying the seat on the trailer, so that by steering the trailer to the right or the left, the cultivating gangs will be swerved to one side or the other.

Without disclaiming anything, and without prejudice to any novelty shown and described, what I claim as my invention is:

1. In a riding cultivator, the combination of a wheeled structure, cultivator gangs connected thereto and adapted to swing laterally, a rear seat for the driver, a seat-supporting structure having draft connection to and trailing behind the wheeled structure to swing laterally relatively thereto, and provided with steering means engaging the ground to sustain the weight of the driver, means whereby the driver has control over said steering means, thereby to swing the seat-supporting structure laterally at will, and connecting means between said seat-supporting structure and said cultivator gangs, whereby swerving of the seat-supporting structure to one side or the other by the action of said steering means will necessarily cause said gangs to swing laterally in the same direction.

2. A cultivator structure as specified in claim 1, said steering means comprising a wheel mounted to be skewed about a vertically disposed axis, said wheel being disposed in position to travel between two rows of corn or other things to be cultivated.

3. A cultivator structure as specified in claim 1, said seat-supporting structure comprising the member upon which the seat is rigidly mounted, and parallel links pivoted on said member and extending forward to points where they are pivoted on said wheeled structure, whereby said seat may swing sidewise without being skewed to the right or the left.

4. A cultivator structure as specified in claim 1, the connection between said seat-supporting structure and the cultivator gangs comprising a transverse bar rigid with the seat support and provided with downwardly extending members having sliding engagement with the cultivator gang frames, whereby the gangs may swing up and down relatively to said seat-supporting structure.

5. A cultivator structure as specified in claim 1, the connection between said seat-supporting structure and the cultivator gangs comprising a transverse bar rigid with the seat support and provided with downwardly extending members having sliding engagement with the cultivator gang frames, whereby the gangs may swing up and down relatively to said seat-supporting structure, in combination with manually controlled means for raising and lowering the cultivator gangs.

6. A cultivator structure as specified in claim 1, said wheeled structure comprising a front axle arch having downturned end portions upon which the front wheels are mounted, a draft frame upon the under side of which the axle arch is mounted, and bracing means insuring a fixed relation between said axle arch and said draft frame, said cultivator gangs having upturned front end portions swivelly connected with the transverse upper portion of said axle arch.

7. A cultivator structure as specified in claim 1, the wheels of said wheeled structure being mounted to be skewed to the right or the left, and there being a controlling connection between said seat-supporting structure and said front wheels, whereby said rear steering means is operative to automatically control the front wheels to steer the machine to the right or the left.

8. A structure as specified in claim 1, said wheeled structure comprising a front axle arch having downturned end portions upon which are mounted the front wheels of the cultivator, in combination with means whereby said rear steering means is operative to control said front wheels to steer the cultivator to the right or the left.

9. A structure as specified in claim 1, said rear seat-supporting structure comprising a casting provided with three vertically disposed bearings, the seat being rigid with said casting, and comprising horizontally and longitudinally disposed links extending forwardly from the two outside bearings, the front ends of said links being swiveled on an axle arch forming part of said previously mentioned wheeled structure, and the middle one of said bearings on said casting being connected by an upper horizontally-disposed link pivotally connected to said axle arch, said steering means comprising a wheel and a support therefor mounted to turn in the middle one of said bearings on said casting, and said controlling means comprising a pair of foot levers rigid with said vertically disposed member.

10. A cultivator structure as specified in claim 1, said steering means comprising a wheel that travels on the ground, and said controlling means therefor comprising a pair of foot levers operative to skew said wheel to the right or the left.

11. A cultivator structure as specified in claim 1, said front wheeled structure having the wheels thereof under control by said rear steering means to steer the cultivator to the right or the left.

12. In an agricultural implement, the combination of means forming a front wheeled structure, rear steering means engaging the ground, having draft connection with and trailing behind said structure, a driver's seat adjacent thereto, supported thereby for lateral movement relatively to said wheeled structure, so that the weight of the driver is sustained by said steering means, ground engaging means, means on said front wheeled structure to raise said ground engaging means without imposing the weight thereof on said steering means, and controlling means whereby the driver exercises control over said steering means.

13. A structure as specified in claim 12, said ground engaging means having connections therefrom to said front wheeled structure permitting lateral movement of said ground engaging means, relatively to said front wheeled structure, together with means whereby said steering means are operative to swerve said ground engaging means laterally.

14. A structure as specified in claim 12, said rear steering means comprising a wheel that travels on the ground, and said controlling means comprising a pair of foot levers operatively connected to skew said wheel to the right or the left.

15. A structure as specified in claim 12, said rear steering means comprising a wheel mounted to be skewed to the right or the left, and having laterally swinging connections extending therefrom to said front wheeled structure.

16. In a riding cultivator, the combination of a wheeled front axle arch, gangs connected to said arch to swing laterally, a wheeled trailer having draft connection with said axle arch to swing laterally, to either side, relatively to said arch, means on said arch to lift said gangs without imposing the weight thereof on said trailer, together with instrumentalities whereby said wheeled trailer may be steered to the right or the left to cause lateral shifting movement of said cultivator gangs.

17. In an agricultural implement, the combination of a front axle arch having wheels, and a rear trailer having draft connection with said arch to swing laterally, to either side, relatively to said arch, and provided with steering means, ground-disrupting devices also swingingly connected to said axle arch and controlled by the steering motion of said trailer, and means on the arch to lift said devices without imposing the weight thereof on said trailer.

Specification signed this 18th day of February, 1925.

SAMUEL H. TINSMAN.